United States Patent [19]

Su et al.

[11] Patent Number: 4,950,476

[45] Date of Patent: * Aug. 21, 1990

[54] METHOD OF CATALYTICALLY OXIDIZING ALCOHOL VAPOR ACCOMPANIED BY VARYING AMOUNTS OF EXCESS OXYGEN

[75] Inventors: Eugene C. Su, Farmington Hills; Thomas J. Korniski, Livonia, both of Mich.; William L. H. Watkins, Toledo, Ohio; Haren S. Gandhi, Farmington Hills, Mich.

[73] Assignee: Ford Motor Company, Dearborn, Mich.

[*] Notice: The portion of the term of this patent subsequent to Apr. 24, 2007 has been disclaimed.

[21] Appl. No.: 927,889

[22] Filed: Nov. 6, 1986

[51] Int. Cl.$^5$ .......................................... B01D 53/36
[52] U.S. Cl. .............................. 423/213.7; 423/245.3
[58] Field of Search .................. 423/213.5, 213.7, 245, 423/245.3

[56] References Cited

U.S. PATENT DOCUMENTS

| | | | |
|---|---|---|---|
| 3,503,715 | 3/1970 | Haensel | 423/213.5 |
| 3,896,616 | 7/1975 | Keith et al. | 423/213.7 |
| 3,993,572 | 11/1976 | Hindin et al. | 502/304 |
| 4,225,561 | 9/1980 | Torres | 422/171 |
| 4,304,761 | 12/1981 | Yoo | 423/213.2 |
| 4,450,244 | 5/1984 | Domesle et al. | 502/185 |

Primary Examiner—Jeffrey Edwin Russel

Attorney, Agent, or Firm—Joseph W. Malleck; Roger L. May

[57] ABSTRACT

A method is disclosed for substantially completely catalytically oxidizing alcohol vapor and/or formaldehyde vapor contained in low concentration in a heated carrier gas mixture at low temperatures such as encountered in exhaust gas treatment during the engine warm-up period and having oxygen present in a wide range of lambda values from momentarily rich (0.8) to very lean engine operation (lambda > 5). The carrier gas mixture is sequentially exposed (i) to a first catalyst consisting substantially of palladium and of rhodium in a weight ratio of Rh/Pd of 0–0.3, and/or $CeO_2$ in a weight ratio of $CeO_2Pd$ of 0–50, and (ii) subsequently immediately to a second catalyst consisting substantially of the base metal silver, whereby the combination of said catalysts synergistically improve the oxidation of said mixture to achieve at least a 96% oxidation conversion of said alcohol vapor and to produce less than 1% of the coverted methanol as aldehydes.

Palladium is effective in converting methanol to $CO_2$ and water vapor at relatively low light-off temperatures in the absence as well as in the presence of excess oxygen. The resultant gas products from oxidation over the palladium catalyst will be elevated in temperature and be more suitable for further conversion by a separate silver catalyst, preferably in the presence of excess oxygen..

2 Claims, 1 Drawing Sheet

METHOD OF CATALYTICALLY OXIDIZING ALCOHOL VAPOR ACCOMPANIED BY VARYING AMOUNTS OF EXCESS OXYGEN

BACKGROUND OF THE INVENTION

1. Technical Field

This invention is directed to a method of substantially completely catalytically oxidizing methanol vapor and/or formaldehyde contained in a heated carrier gas and, more particularly, to a method of treating exhaust gases generated by burning a methanol fuel in an internal combustion engine.

2. Description of the Prior Art

As an alternative fuel for automotive vehicles, methanol ($CH_3OH$) has a high octane number that allows a spark-ignited internal combustion engine to operate at a high compression ratio for improved fuel economy. However, methanol fueled vehicles yield emissions of undesirable partial oxidation products, such as formaldehyde, as well as of unburned fuel, especially during the cold start portion of the driving cycle. Because of its potency as an eye irritant and as an ozone precursor, the formaldehyde emitted from methanol fueled vehicles must be efficiently reduced to a minimum.

Since methanol fueled engines of the future may be calibrated for a wide range of operations from stoichiometric conditions to lean burn conditions, the catalyst must be effective for complete oxidation of methanol over a wide range of methanol fuel mixtures supplied to the engine.

To date, the prior art has been concerned with either a lean or a stoichiometric engine calibration. In U.S. Pat. No. 4,304,761 there is described the preparation of an active silver (Ag) catalyst for the control of emissions from a methanol fueled vehicle, the engine of which is calibrated for lean burn conditions as exhibited by the test data of said patent. This patent concluded that the base metal silver alone would completely oxidize methanol at low concentrations, but only in the presence of excess oxygen (lean mixtures), to carbon dioxide and water vapor without production of deleterious amounts of aldehydes (3% or less), ethers, or carbon monoxide. More recent studies have shown that a 3% conversion of methanol, present in the exhaust gas, to aldehydes is not acceptable as a nonregulated automotive emission. The study in the said patent used a laboratory simulation of the exhaust gas from an engine that would require a lean air/fuel mixture to yield an exhaust gas containing 1% excess oxygen. The results of the study of both the treated silver catalyst and other catalysts for oxidizing methanol (all pretreated by heating at 800° C. for six hours) were obtained at a space velocity of 300,000 $Hr^{-1}$ and were based on results for granular catalytic support material (i.e., without monolithic substrate). This space velocity should not be compared with the space velocities applicable to comparable catalysts based on monolith substrates.

The results in the said patent show that certain catalysts, such as palladium and rhodium, did not function as well as the silver catalyst under the test conditions, and that patent reports that these materials have an undesirable affinity for producing aldehydes. There was no investigation of how silver, or any of the other catalysts employed, would perform in the presence of little or no oxygen or at conditions typical of exhaust gases issuing from an internal combustion engine.

In U.S. patent application Ser. No. 921,027 (assigned to the assignee of this invention), it is demonstrated that palladium, when supported on a monolithic ceramic substrate of a desirable cell density, is effective in converting methanol to $CO_2$ and water vapor accompanied by little or no formaldehyde formation when the engine is calibrated for stoichiometric conditions.

Silver and palladium have not been used together in any specific separated sequence for treatment of exhaust gas containing alcohol vapor. The prior art, in the use of sequential treatment of exhaust gases, has been concerned only with the exhaust gases from a gasoline fueled vehicle, which gases are emitted at much higher temperatures. Such is exemplified in (i) U.S. Pat. No. 3,503,715 which used two separate pellet bed catalysts, (ii) U.S. Pat. No. 3,896,616 which combined an extraneous fuel with gasoline exhaust gases at temperatures of 500-1400° F. to reduce nitrogen oxides, hydrocarbons, and carbon monoxide to acceptable levels (each bed of which comprised the same catalyst), and (iii) U.S. Pat. No. 4,225,561 wherein the catalyst of the first bed was comprised of comingled silver and palladium and the catalyst of the second bed was comprised of chromium. None of these patents discuss the concept or need for reducing formaldehyde as a result of converting methanol fuel since gasoline was the only fuel involved.

Thus it remains a problem to be able to effectively oxidize residual alcohol vapor, particularly methanol, in the exhaust gas of an alcohol fueled vehicle to ensure that little aldehydes remain in the exhaust gas, regardless of whether the engine uses a rich, lean, or stoichiometric air/fuel mixture.

SUMMARY OF THE INVENTION

It is a primary object of this invention to provide an efficient method of catalytically oxidizing alcohol vapor in a carrier gas with little or no production of aldehydes, the carrier gas containing alcohol in a low concentration (i.e., 0.01-1.0%), and containing varying amounts of excess oxygen in a wide range of lambda (0.8-8.0).

It is also an object of this invention to provide a method of catalytically oxidizing methanol vapor contained in the exhaust gas of a methanol fueled internal combustion engine which is calibrated either for stoichiometric or for lean burn air/fuel mixtures, the oxidation process achieving 96% or greater conversion of such methanol to $CO_2$ and water vapor, and the aldehyde formation being below 1% of the converted methanol.

The invention concerns a method of substantially completely catalytically oxidizing alcohol vapor and/or formaldehyde vapor contained in low concentration in a heated carrier gas mixture (at low temperatures such as 150° C.) having oxygen present in a wide range of lambda (0.8-8.0). Lambda is defined as the ratio of $O_2$/alcohol over the theoretical ratio of $O_2$/alcohol for complete oxidation.

The method comprises sequentially exposing the mixture (i) to a first catalyst consisting substantially of palladium and of rhodium in a weight ratio of Rh/Pd of 0-0.3, and/or $CeO_2$ in a weight ratio of $CeO_2$/Pd of 0-50, and then (ii) to a second catalyst consisting substantially of silver, whereby the combination of said catalysts synergistically improve the oxidation of said mixture to achieve at least a 96% oxidation conversion of said alcohol (under typical engine operations calling for a wide range of air/fuel mixtures) and with less than 1% of the converted methanol as aldehydes.

It has been found that palladium is effective in converting methanol to $CO_2$ and water vapor at relatively low temperatures, with or without the presence of excess oxygen. However, in the presence of excess oxygen, such as present in the exhaust gas from a methanol fueled lean burn engine, a significantly large amount of aldehydes is produced. On the other hand, silver is effective in converting methanol to $CO_2$ and water vapor in the presence of excess oxygen but only at relatively higher temperatures. By using the oxidation process catalyzed by palladium for the initial treatment of the exhaust gas from a lean engine, the resultant gas mixture will be elevated in temperature by virtue of the chemical heat released from the oxidation process, and hence becomes more suitable for further conversion by a silver catalyst of the methanol and aldehydes remaining in the exhaust gas. Therefore, the combination of a palladium catalyst immediately in advance and juxtaposed to a silver catalyst provides a synergistic catalytic oxidation process for alcohol vapors and their by-products.

Preferably the alcohol is methanol and is present in the carrier gas or exhaust gas in an amount of 0.01-1.0% by volume of the mixture; the carrier gas or exhaust gas is heated to at least a light-off temperature of about 150° C; and the carrier gas may contain excess oxygen, represented by lambda, in a wide range of 0.8-8.0.

Preferably, each of said catalysts are supported on a monolithic ceramic substrate, the ceramic substrate having a cell density of 50-70 cells per square inch, and a gamma aluminum oxide coating is interposed between said ceramic substrate and the catalyst. Preferably, the first and second catalysts are juxtaposed with spacing therebetween being no greater than 1.5 inches.

DETAILED DESCRIPTION AND BEST MODE

Figure 1:
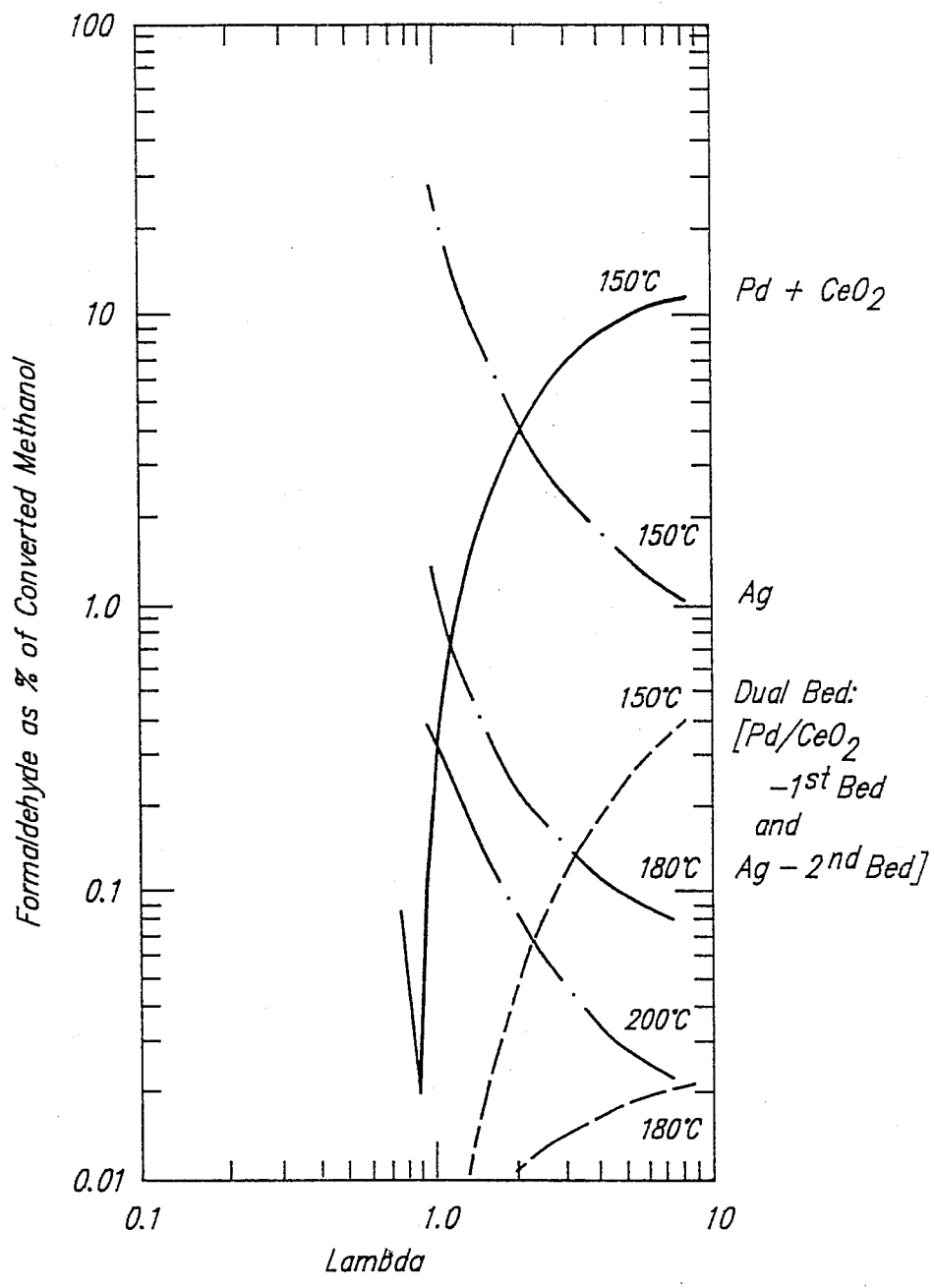
FIG. 1 is a graphical illustration depicting the variation of formaldehyde selectivity with lambda for various catalysts of interest to the following described of this invention.

The description which follows sets forth what we now contemplate to be the best mode of carrying out the method of this invention. While this description presents a preferred embodiment of our method of treating exhaust gases from a methanol fueled internal combustion engine, it is not intended to be a limitation upon the basic principles of the invention. By methanol fuel we mean a substantially pure methanol fuel which contains about 95% pure methanol with up to about 5% by volume of a hydrocarbon fuel, such as isopentane, for the purpose of facilitating cold-start of the engine. Alcohol fuels which have been used successfully for powering an internal combustion engine have included methanol and ethanol. Methanol is produced by the gasification of coal or modification of natural gas, and ethanol is obtained by fermentation of a biomass with subsequent distillation. Ethanol is more suitable as a fuel commodity in certain foreign countries other than the U.S., whereas methanol is an appropriate alcohol fuel with greater potential for use in the U.S. where there is an abundant supply of coal and natural gas reserves.

Cold-Start Condition

Neither a palladium catalyst by itself or a silver catalyst by itself has been capable of satisfactorily and efficiently converting methanol to harmless elements without the production of significant formaldehyde when a methanol fueled engine is cold-started while calibrated for lean air/fuel mixtures. During the cold-start condition, large quantities of unburned methanol and other partial oxidation products, such as carbon monoxide, are present in the engine exhaust gas while the catalyst remains at a low temperature varying from ambient temperature initially to a temperature of just under 200° C. during an interim period of a few seconds. It is during this start-up period that the major amount of unwanted exhaust products are emitted. However, the conditions of the exhaust gas quickly change after cold-start to a warmed engine condition where little unburned methanol is generated as a result of a more complete combustion in the engine.

During the engine warm-up period, after the start-up in cold weather, a rich exhaust gas (deficient in excess oxygen) will be produced when such lean calibrated engine is operated under a choked condition. A lean exhaust gas (having excess oxygen) will be produced during cruise driving condition of the lean calibrated engine; but during acceleration and deceleration modes of driving, a rich exhaust gas will again be momentarily encountered. Thus, to maintain consistent and effective control of formaldehyde emissions along with a high methanol conversion in the exhaust gas treatment for such lean engines, the catalyst system must be consistently effective for treating exhaust gases from an engine operated with rich, stoichiometric as well as lean fuel/air mixtures. A unitary catalyst, such as Pd, which is effective with little or no excess oxygen, or a unitary catalyst, such as silver, which is effective only in the presence of excess oxygen and at relatively high temperatures, cannot provide consistently effective control of aldehyde emissions from a lean calibrated engine operated under typically varying driving conditions.

It was discovered by virtue of this invention that if a palladium catalyst is placed upstream from an independent silver catalyst, the closely juxtaposed dual bed system can operate in synergism to achieve consistent and reliable treatment of the exhaust gas, during the lean cruise operation of a warmed-up engine as well as during the choked operation after cold-start in winter or during the acceleration or deceleration transient periods, so as to maintain a very high conversion of the unburned methanol and a minimal emission of aldehydes representing less than 0.5% of the converted alcohol.

Exhaust Gas Contents

The concentration of alcohol, particularly of methanol, that is present in the exhaust gas from the internal combustion engine operations is usually in the range of 0.01-1.0% by volume. The amount of unburned alcohol or methanol after the combustion process is dependent upon the efficiency of the combustion process, which will be less efficient with a rich air/fuel mixture. Irrespective of whether rich, lean, or stoichiometric conditions are achieved in the combustion process, there will be some degree of formation of aldehydes, particularly formaldehyde, that will accompany the presence of unburned alcohol. If the formaldehyde present were left untreated, this would lead to an odor nuisance as well as to irritation of the eye and other mucous membranes. In addition, in the presence of nitrogen oxides, the aldehydes will partake in photo oxidation processes whereby phytotoxic substances and ozone will be formed. Thus, the complete oxidation of unburned alcohol and partial oxidation products in the engine exhaust gas is essential in order to minimize emissions of formaldehyde as well as unburned alcohol. Since the exhaust gas from an alcohol fueled vehicle is at a substantially lower temperature than the exhaust of a gasoline fueled vehicle (i.e., by a difference of at least 100° C.), a highly efficient catalyst system is required.

The feedgas for the catalytic treatment by the process of this invention will thus contain alcohol in an amount of 0.01-1.0% by volume and excess oxygen in an amount of 0-10% by volume. The excess oxygen content will be higher for engines that are calibrated for lean burn and thus will predominantly represent conditions conducive to the operation of a catalyst that calls for a considerable amount of excess oxygen with lambdas being greater than 5. However, even with engines that are calibrated for lean combustion, there will be periods of acceleration and deceleration when rich conditions will prevail momentarily, requiring the catalyst to be effective for the removal of methanol and formaldehyde in the absence as well as in the presence of excess oxygen. Oxygen which is within 0.5% of the stoichiometric oxygen required for complete oxidation of the alcohol is considered to denote little or no excess oxygen content. However, when the oxygen content is in the range exceeding 0.5 up to 10%, it is considered to denote high excess oxygen conditions resulting from lean burn calibration.

Oxidation Sequence

Since most of the exhaust emissions take place during the engine warm-up period, it is imperative to achieve substantially complete oxidation of the unburned alcohol and other partial oxidation products to carbon dioxide and water vapor during this period. It is a relatively simple matter to achieve complete oxidation of unburned alcohol and other products at highly elevated temperatures (i.e., well above 300° C. as is obtained after the engine warm-up period), provided an adequate oxygen supply is present. This has been demonstrated by U.S. Pat. No. 4,304,761. However, to effect efficient and substantially complete oxidation of the alcohol and formaldehyde at low temperatures, and under conditions with varying oxygen contents, poses a technically difficult problem. Specifically, this invention demonstrates the advantage of treating the carrier gas or exhaust gas sequentially (i) by a first catalyst consisting substantially of palladium and of (a) rhodium in a weight ratio of Rh/Pd of 0-0.3, and/or (b) $CeO_2$ in a weight ratio of $CeO_2$/Pd of 0-50; and (ii) subsequently immediately by a second catalyst physically separated from the first catalyst and consisting substantially of silver. With this sequential dual bed catalytic treatment, the oxidation process taking place within the first catalyst will promote conditions more favorable for the necessary further alcohol and formaldehyde oxidation over the second catalyst, thereby to consistently attain (i) at least 96% oxidized conversion of the alcohol vapor when the engine exhaust gas contains oxygen at a level of at least 1.0 lambda and at least 85% when lambda is less than 1.0, lambda and (ii) with less than 1% of the converted alcohol as aldehydes, regardless of the engine combustion calibration or the air/fuel mixture employed for the engine combustion process.

Catalyst Materials and Loading

The catalyst, in the form of a precious metal in the first catalyst and in the form of a base metal silver in the second catalyst, is usually applied over a washcoat material which acts as an intermediate support between the catalysts and the monolithic ceramic substrate. The washcoat material is usually comprised of gamma alumina, alpha alumina and/or zirconia. Gamma alumina, in particular, has an extremely large surface area per unit volume when compared to other washcoat materials and is the preferred washcoat material. To enhance the stability of the washcoat material, ceria (cerium oxide) may be included in the catalyst formulation, preferably present in a weight ratio of up to 50/1.

Ceria also serves to improve the catalyst activity for carbon monoxide oxidation and catalyst oxidation storage capacity. The latter is particularly important in facilitating the catalytic performance of the first catalyst by compensating for any momentary oxygen deficiency in the feedgas with the stored oxygen.

The catalyst materials are loaded onto the support, and the amount of loading will depend on the requirements for the control of the regulated emissions of carbon monoxide, hydrocarbons, and nitrogen oxides as well as of the nonregulated but undesirable emissions of alcohol and formaldehyde, and, ultimately, on the volume as well as the composition and temperature of the exhaust gas to be treated. For each specific application of the catalytic treatment, the catalyst material loading must be optimized to minimize the catalyst requirements, while ensuring the desired catalyst activity during its required useful life for 50,000 vehicle miles. We have found that in the first catalyst, the Palladium loading may be in the range of 0.05-1 0% which encompasses the useful range of practical interest, or preferably in the range of 20-40 grams per cubic foot. The loading of silver for the second catalyst can be in the range of 0.2-4.0% by weight, or preferably in the range of 80-120 grams per cubic foot. Cerium oxide may be loaded in an amount of 1-10% by weight, or preferably in the range of 100-200 grams per cubic foot.

For the first catalyst, it may be necessary to co-impregnate a small amount of rhodium along with the palladium in a weight ratio of rhodium/palladium of up to 0.3/1, since rhodium is more effective than palladium for the reduction of nitrogen oxides in the exhaust gas.

The catalyst preparation follows the standard procedure and methods as are known to those skilled in the art of the preparation of the automotive catalyst for engine exhaust treatment.

Catalyst Support and Substrate

Catalyst material, as indicated earlier, is dispersed in a manner well known in the art on a suitable washcoat material. The washcoat material serves as the catalyst support and is in turn dispersed on a substrate. The substrate is typically a monolithic ceramic matrix which has approximately 60 open square channels along the longitudinal axis per square centimeter of cross-sectional area. The specific monolithic structure used here is made of cordierite (which is chemically comprised of $(Al_2O_3)_2(MgO)_2(SiO_2)_5$, and has 62 square channels per square centimeter and 25 weight percent gamma alumina as a washcoat on the channel walls. A monolithic type of ceramic substrate is assumed in this invention as it is the preferred catalyst support substrate for automotive exhaust treatment at a high space velocity with a minimal pressure drop. By definition, space velocity is the ratio of volumetric flow rate of the gas to be treated to the catalyst volume used and thus it is a measure of catalyst activity. For catalytic treatment of automotive exhaust gas, as for any other catalytic process, a high space velocity is desired that is consummate with the highly active and durable catalyst obtainable. For the treatment of automotive exhaust gases with monolithic catalysts, a space velocity in the range of 30,000–60,000 $Hr^{-1}$ has been found to be practical. If pellet type or wire mesh catalysts were employed, such space velocities might not be obtained.

Catalyst Positioning

The physical configuration of the dual bed catalyst system is of critical importance to this invention. Since silver catalyst is effective for complete oxidation of methanol only at relatively high temperatures and in the presence of excess oxygen, it must be preceded by the precious metal catalyst which is capable of achieving high methanol conversion at comparatively lower temperatures and in the absence as well as in the presence of excess oxygen. In such configuration, the maximum obtainable elevation of the gas temperature will be achieved as a result of the chemical heat evolved from the high conversion obtained in the first catalyst bed, and this in turn will substantially raise the temperature of the silver catalyst in the second bed and thus increase its activity significantly since catalyst activity increases exponentially with temperature.

The importance of this chemical heat synergistic effect to the treatment of engine exhaust gas will be better appreciated by noting that during the engine warm-up period the exhaust gas contains a large amount of CO beside unburned fuel and that the chemical heat released from the oxidation of CO is comparatively very large since the CO concentration in the exhaust gas is considerably greater than that of the unburned methanol. Since palladium catalyst is much more effective for the oxidation of CO as well as of methanol, a superior dual bed catalyst system for the exhaust treatment will result by the use of the palladium catalyst in the first bed to be immediately followed by the silver catalyst in the second bed.

It is thus important that the second catalyst bed should be physically located as close to the first bed as can be accommodated from practical considerations, such as regarding the manufacture of the hardware for the assembly of the dual bed catalyst system. Present technology for the manufacture of a dual bed catalyst canister can attain a distance of about one inch between two catalyst beds, which will be of identical cross-sectional geometry for obvious reasons. Preferably, the dual bed catalyst canister should be well insulated, when such insulation would be practical, so as to maximize the chemical heat synergistic effect.

EXAMPLES

Several catalyst materials, without as well as within the teaching of this invention, were evaluated in an experimental apparatus which consisted of a standard laboratory flow reactor system as described in an article by E. C. Su et al, "An Applied Catalyst Catalysis", Vol. 12, Page 59 (1984). The catalyst materials were prepared by conventional impregnation techniques and the substrates were monolithic cordierite structures with 62 square channels per square centimeter and with 25 weight percent gamma alumina as a washcoat on the channel walls. The washcoated substrates were impregnated with the catalyst material and were calcined in air at 500° C., each thermally aged four hours at 800° C. The aged catalysts, singly or in dual bed configurations, were exposed to a simulated exhaust gas at varying temperatures and at a space velocity of 60,000 $Hr^{-1}$ to ascertain its efficiency under typical conditions for exhaust gas treatment. The simulated exhaust gas was made by mixing a methanol saturated nitrogen stream with the necessary amounts of air and dilution nitrogen to yield the desired $O_2$ and methanol mixture. The composition of the feedgas was varied by changing the oxygen concentration at a constant methanol concentration of 0.5 volume percent. In terms of lambda, the feedgas composition was varied in the range of 0.8–8.0 lambda. The feedgas temperature was increased normally in the range of 150–200° C., until substantial methanol conversion was obtained. The methanol partial oxidation products (formaldehyde, in particular) were determined by Fourier transformed infrared (FFTIR) spectroscopic analysis of the reactor effluent collected in a Teflon bag. The oxygen concentration in the feedgas was determined by a Ford/Lambda Oxygen Analyzer.

As shown in Table I, examples I and II demonstrate that the palladium catalyst, with or without ceria, can achieve a very high methanol conversion over a wide range (1–7) of lambda at a low temperature of 150° C. and that the formaldehyde yield from methanol oxidation over palladium increases dramatically with lambda. Thus, the lambda must be maintained near the stoichiometric value of 1 in order to ensure a high methanol conversion with a minimal formaldehyde emission.

Example III shows the effect of the addition of rhodium to the palladium catalyst, such as necessary for the effective control of NOx emissions in the exhaust gas. The same trend of formaldehyde yield with lambda as found in examples I and II was observed. Although the formaldehyde level was lower in the case of example III, it remained above 1% at a lambda greater than 4.

It is thus demonstrated that the palladium catalyst, by itself or with the addition of ceria or rhodium, will result in unacceptable formaldehyde emissions from engines calibrated for lean fuel/air mixtures, such as desirable in order to take maximum advantage of the high octane methanol fuel in terms of engine performance and fuel economy.

Examples IV and V demonstrate that the silver catalyst is active only at relatively high temperatures (>200° C.) and that it produces more formaldehyde as lambda approaches the stoichiometric value, especially at temperatures below 180° C. Thus, the silver catalyst by itself is not effective for the complete oxidation of methanol at temperatures encountered during the engine warm-up period.

Examples VI and VII show that a mixed Pd+Ag catalyst prepared by impregnation of palladium and silver onto the same catalyst support would produce high formaldehyde emissions in treating stoichiometric as well as lean exhaust gases at temperatures encountered during the warm-up period and with a low methanol conversion at lambda below 2. Since silver and palladium are known to form alloys with surface enrichment of silver or palladium depending on the nature of the gas and temperature history, such alloy formation as would occur during the treatment of exhaust gas would be difficult to predict. For this reasons, as well as in view of the results demonstrated by examples VI and VII, such mixed catalysts would be undesirable and ineffective.

Example VIII demonstrates the superiority of the dual bed catalyst system of this invention. As shown in Table I and FIG. 1, at a relatively low temperature of 150° C., the dual bed catalyst system maintained a very high methanol conversion with an extremely low formaldehyde emission, less than 0.5% of converted methanol over a wide range of lambda from 0.9 to 7.

Specifically, the dual bed catalyst system of example VIII consisted of an identical sample of the Pd+CeO$_2$ catalyst used in example II followed by an identical sample of the silver catalyst used in example IV, for the purpose to demonstrate the ability of the dual bed system to ensure a minimal formaldehyde even when the palladium catalyst by itself would produce a very large amount of formaldehyde (i.e., 11%) at low temperatures and a lambda of 7. It is apparent that if an identical sample of the Pd+Rh+CeO$_2$ catalyst used in example III were used as the first bed catalyst, the resultant dual bed catalyst system would result in even lower formaldehyde emissions.

A synergistic effect due to the chemical heat released in the first palladium catalyst bed is apparent from a comparison of the results for examples II, IV, and VIII. For instance, at lambda of 7 one would expect 11% of the methanol converted in the first bed as formaldehyde. As a first order approximation, the 1% conversion of this formaldehyde over the silver catalyst may be estimated by the 1% conversion of methanol obtained over the silver catalyst of example IV at the same feedgas temperature. Thus, if the gas temperature were to remain at 150° C. one would expect a 20% reduction of formaldehyde, i.e., from 11% to 9% as compared to a reduction of from 11% to 0.3% actually observed. The very low formaldehyde emissions found in example VIII demonstrate clearly the superiority of the dual bed catalyst system of this invention as ascribed to a maximum chemical heat synergistic effect achieved by the specific types of catalysts used in the specific configuration described above.

The dual bed catalyst system of this invention maintains significantly lower formaldehyde emission levels than obtainable with a commercial three-way catalyst used for the treatment of exhaust gas from gasoline fueled engines. As shown by example IX, the three-way catalyst would yield higher formaldehyde emissions during rich (lambda <1) and very lean engine operation.

While particular embodiments of the invention have been illustrated and described, it will be obvious to those skilled in the art that various changes and modifications may be made without departing from the invention, and it is intended to cover in the appended claims all such changes and modifications as fall within the principle and scope of this invention.

TABLE I

| Example | Catalyst ID | Temp. (°C.) | Lambda | Methanol Conversion (%) | Formaldehyde As % of Converted Methanol |
|---|---|---|---|---|---|
| Single Bed Catalyst | | | | | |
| I | Pd | 150 | 7.0 | 98 | 5.3 |
| | | | 2.0 | 99 | 2.0 |
| | | | 1.0 | 99+ | 0.4 |
| II | Pd + CeO$_2$ | 150 | 9.0 | 98 | 11.0 |
| | | | 2.0 | 99 | 3.7 |
| | | | 1.0 | 99+ | 0.3 |
| | | | 0.9 | 92 | 0.02 |
| | | | 0.8 | 82 | 0.06 |
| III | Pd + Rh + CeO$_2$ | 150 | 7.0 | 99 | 1.7 |
| | | | 2.0 | 99 | 0.8 |
| | | | 1.0 | 99+ | 0.2 |
| IV | Ag | 200 | 7.0 | 99 | 0.02 |
| | | | 1.1 | 89 | 0.3 |
| | | 150 | 7.0 | 20 | 1.2 |
| | | | 1.0 | 10 | >20 |
| V | Ag + CeO$_2$ | 200 | 7.0 | 99 | 0.2 |
| | | | 1.1 | 89 | 0.6 |
| Mixed Catalysts | | | | | |
| VI | Pd + Ag | 150 | 7.0 | 97 | 1.8 |
| | | | 2.0 | 74 | 6.0 |
| | | | 1.0 | 48 | 5.0 |
| VII | Pd + Ag + CeO$_2$ | 150 | 7.0 | 91 | 2.2 |
| | | | 1.0 | 16 | 10.0 |
| Dual Bed Catalyst | | | | | |
| VIII | Pd + CeO$_2$/1st bed Ag/2nd bed | | 7.0 | 98 | 0.3 |
| | | | 2.0 | 99 | 0.04 |
| | | | 1.0 | 99 | 0.01 |
| | | | 0.9 | 92 | 0.01 |
| Three-Way Catalyst | | | | | |
| IX | Pt + Rh + CeO$_2$ | | 7.0 | 99 | 0.8 |
| | | | 2.0 | 99 | 0.3 |
| | | | 1.0 | 99 | 0.2 |
| | | | 0.8 | 75 | 2.5 |

We claim:

1. A method of substantially completely oxidizing alcohol and/or formaldehyde vapor contained in the exhaust gas of a methanol fueled engine, heated to a temperature of about 150° C., while using air/fuel mixtures of lambda from 0.9-7.0 for combustion in said engine, the method comprising the treatment of said exhaust gas mixture (i) by a first catalyst consisting substantially of palladium or palladium and rhodium in a weight ratio of Rh/Pd of 0-0.3, and (ii) subsequently immediately by a second catalyst, physically separate from said first catalyst, and consisting substantially of silver, whereby the oxidation process taking place within said first catalyst promotes more favorable conditions for increased alcohol or formaldehyde oxidation processes within said second catalyst, thereby to produce an oxidized exhaust gas mixture having less than 0.5% of the converted methanol as formaldehyde, and at least 96% conversion of said methanol vapor.

2. A method for substantially completely oxidizing the alcohol and/or formaldehyde vapor contained in the exhaust gas mixture of a methanol fueled engine, heated to a temperature of about 150° C., while using air/fuel mixtures of lambda from 0.9–1.0 for combustion in said engine, the method comprising the treatment of said exhaust gas mixture (i) by a first catalyst consisting substantially of palladium and $CeO_2$ in a weight ratio of $CeO_2/Pd$ of 0–50, and (ii) subsequently immediately by a second catalyst, physically separate from said first catalyst, and consisting substantially of silver, whereby the oxidation process taking place within said first catalyst promotes more favorable conditions for increased alcohol or formaldehyde oxidation processes within said second catalyst, thereby to produce an oxidized exhaust gas mixture having less than 0.5% of the converted methanol as formaldehyde, and at least 96% conversion of said methanol vapor.

* * * * *